June 2, 1931. C. E. HARRIS 1,808,655
AUTOMOBILE TURNTABLE AND CARRIER
Filed Oct. 18, 1929 3 Sheets-Sheet 2
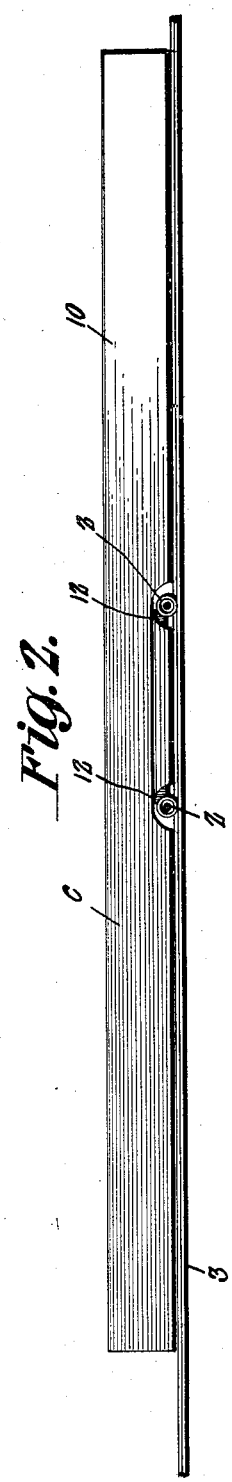

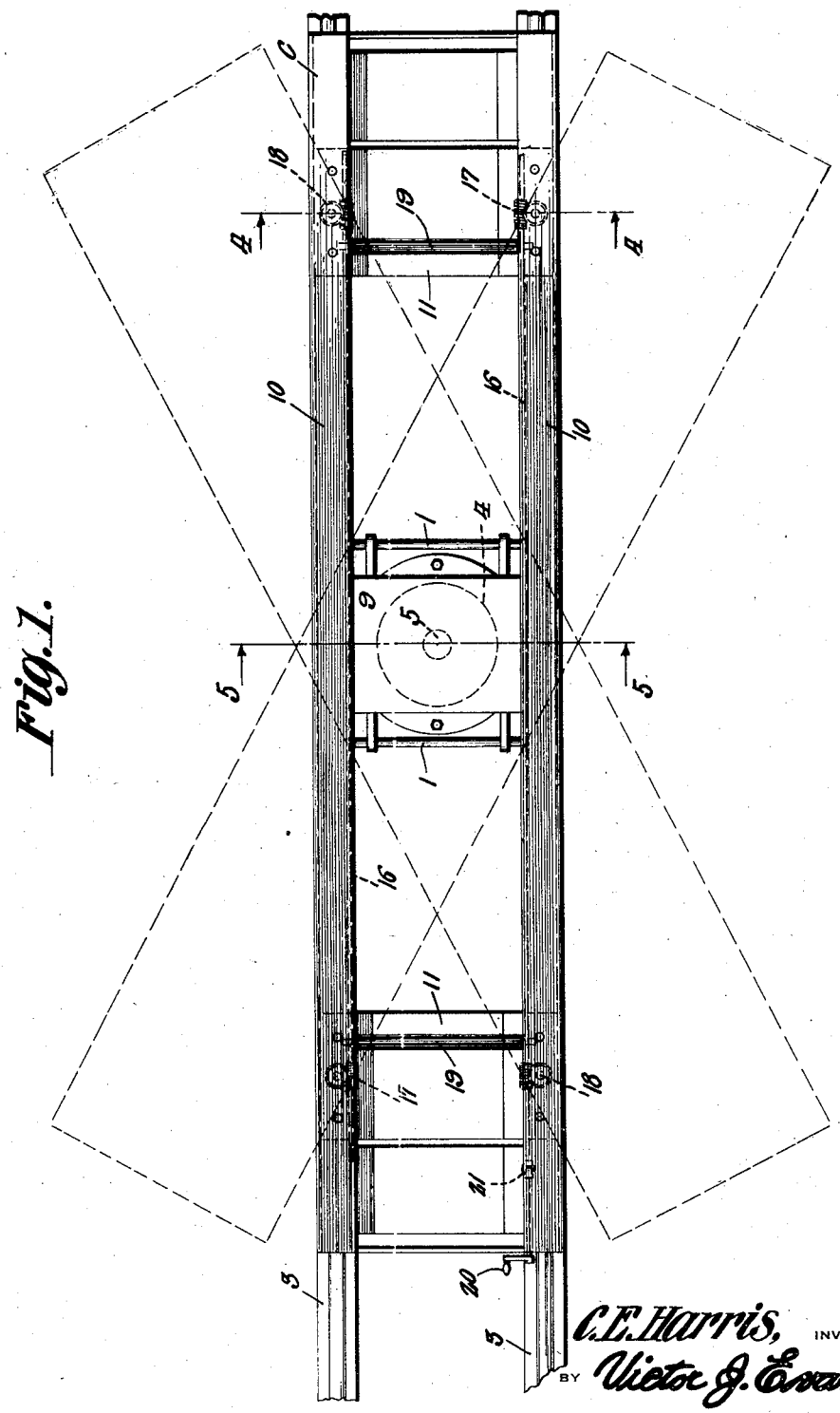

June 2, 1931.  C. E. HARRIS  1,808,655
AUTOMOBILE TURNTABLE AND CARRIER
Filed Oct. 18, 1929   3 Sheets-Sheet 3
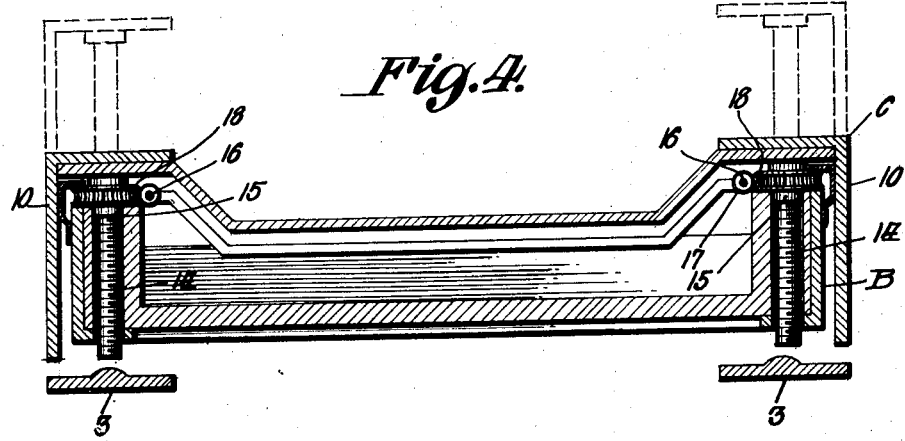
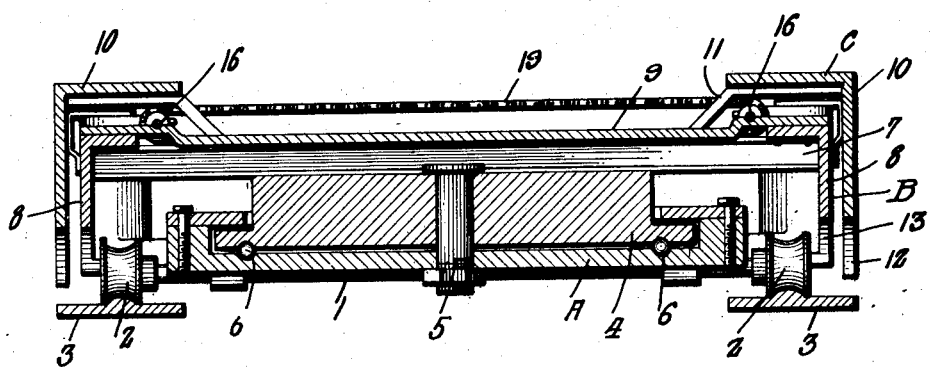
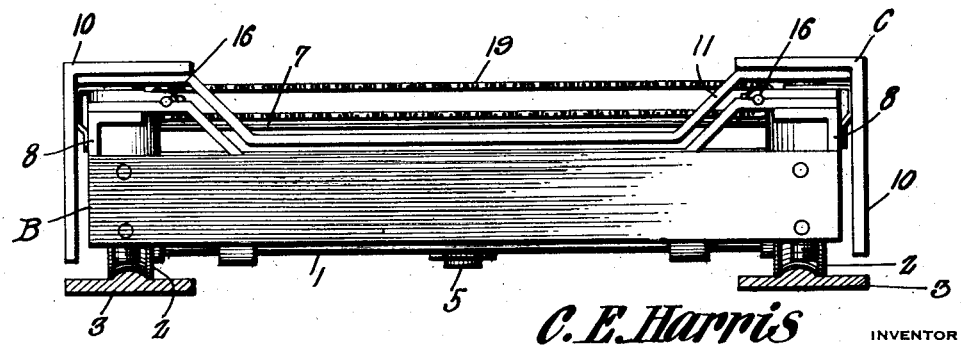
C. E. Harris
INVENTOR
BY Victor J. Evans
ATTORNEY Patented June 2, 1931

1,808,655

UNITED STATES PATENT OFFICE

CHARLES E. HARRIS, OF MONTPELIER, IDAHO

AUTOMOBILE TURNTABLE AND CARRIER

Application filed October 18, 1929. Serial No. 400,573.

This invention relates to a turntable for motor vehicles and the like the general object of the invention being to provide a vertically movable frame supported on a turntable which is provided with wheels so that a vehicle can be run over the device and the frame lifted to move the wheels of the vehicle off the floor and then the device can be rolled in front of the store or space which is to receive the vehicle and then by turning the frame on the turntable and lowering the frame, the vehicle can be either run forwardly or reversely into the space.

This invention also consists in certain other features of construction and in the combination and arrangement of the several parts, to be hereinfter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a plan view of the invention, showing the frame in two different positions by dotted lines.

Figure 2 is an elevation of the device.

Figure 3 is a fragmentary plan view, wth parts in section.

Figure 4 is a section on line 4—4 of Figure 1.

Figure 5 is a section on line 5—5 of Figure 1.

Figure 6 is an end view.

As shown in these views, A indicates a frame which is supported on the axles 1 having the wheels 2 at their ends for engaging the tracks 3 placed on the floor of a garage or other building. As shown, the wheels have their circumference of concaved shape and the rails are formed with convex portions which are engaged by the wheels. A turntable 4 is rotatably supported on the frame, the king bolt of the table being shown at 5, and anti-friction means 6 are placed between the frame and the table.

The frame B, of elongated form, is supported at its center on the turntable by the cross beams 7. Said frame B includes the angle shaped side members 8 and the cross members 9 which fasten the side members together. A vertically movable frame C is supported on the frame B, this frame C including the angle-shaped side members 10 and the cross members 11 which connect the side members 10 together. The side portions of the side members 10 of the frame C extend over the sides of the frame B and when said frame C is in lowered position, the lower edges of the side portions of the members 10 almost contact the floor. The sides of the two frames B and C are recessed as shown at 12, to permit turning movement of the frames without interference on the part of the wheels or their axles.

Four screw shafts 14 are arranged in sockets formed in the frame B and each shaft passes through a nut member 15 at the upper end of each socket, the nut member being rotatably supported in the frame B and the upper ends of the screw shafts are fastened to the horizontal portions of the side members 10 of the frame C so that when the nut members are rotated, the shafts 14 are moved longitudinally and thus raise or lower the frame C. A pair of these screw shafts is arranged adjacent each end of the device.

A pair of longitudinally extending shafts 16 is journaled in the frame B, adjacent the side members thereof, and each shaft carries a pair of worms 17, these worms engaging the worm gears 18 connected with the nut members 15, and the two shafts are connected together by the chains and sprockets shown generally at 19. A crank handle 20 is connected with one end of one shaft 16 by the universal joint 21. Thus by turning the crank handle, both shafts will be rotated so as to cause the nut members to raise or lower the screw shafts and thus raise or lower the frame C.

The device is so formed that when the frame C is in lowered position, a motor vehicle or the like can be driven over the same, with the axles and wheels of the vehicle straddling the device. Then the crank handle is turned to cause the frame C to engage the axles of the vehicle and lift the vehicle so that its wheels will not contact the floor.

The entire device, with the vehicle thereon, can then be shoved along the tracks 3 until the vehicle comes opposite the space or stall which it is to occupy. Then the frames B and C are turned on the table until one end of the device is opposite the stall and then by lowering the frame B, the vehicle can be pushed or run into the stall or space and it may be either backed or run forwardly into the space.

A handle 22 is connected with one end of the device so that the same can be pushed or pulled along the track, though it will, of course, be understood that any part of the frame can be pushed or pulled to move it along the track or to cause it to swing on the turntable.

The cross pieces of both frames should be formed of low intermediate portions, as shown in the drawings, so that these parts will not interfere with the passage of a vehicle over the device.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device of the class described comprising a wheel supported turntable, an elongated frame supported at its center on the turntable, a second frame supported by the first frame, vertically arranged screw shafts having their upper ends connected with the second frame, nut members carried by the first frame and engaging the screw shafts, a worm gear associated with each nut member, a pair of longitudinally extending shafts in the first frame, worms on said shafts engaging the before mentioned worm gears, chain and sprocket means for connecting the two shafts together and a handle for rotating one of the shafts for raising and lowering the second frame.

2. A device of the class described comprising a wheel supported turntable, a track on which the wheels operate, an elongated frame supported at its center on said turntable, a second frame supported on the first frame, each frame including angle-shaped side members and cross members connecting the side members together, the vertical portions of the side members of each frame extending to a point adjacent the track, and manually operated means for raising and lowering the second frame.

In testimony whereof, I affix my signature.

CHARLES E. HARRIS.